United States Patent [19]

Meisner et al.

[11] Patent Number: 4,904,865

[45] Date of Patent: Feb. 27, 1990

[54] EXTERNALLY MOUNTED RADIOACTIVITY DETECTOR FOR MWD

[75] Inventors: James E. Meisner, Citrus Heights; Roger L. Tresler, Sacramento; Edward S. Mumby, Carmichael; Micheal D. Robie, Folsom, all of Calif.

[73] Assignee: Exploration Logging, Inc., Sacramento, Calif.

[21] Appl. No.: 177,389

[22] Filed: Apr. 1, 1988

[51] Int. Cl.[4] .......................... G01V 5/10; G01V 5/12; G01V 5/14
[52] U.S. Cl. ..................................... 250/254; 250/266
[58] Field of Search ................. 250/254, 266, 264, 265

[56] References Cited

U.S. PATENT DOCUMENTS

| | | |
|---|---|---|
| 2,475,137 | 7/1949 | Herzog . |
| 2,481,014 | 9/1949 | Herzog . |
| 2,493,346 | 1/1950 | Herzog . |
| 2,666,146 | 1/1954 | Herzog . |
| 2,740,898 | 4/1956 | Youmans . |
| 2,857,522 | 10/1958 | Jones . |
| 2,902,603 | 9/1959 | Ferre . |
| 2,937,278 | 5/1960 | Copland . |
| 3,049,619 | 8/1962 | Genovese, Jr. . |
| 3,255,353 | 6/1966 | Scherbatskoy ..................... 250/254 |
| 3,654,464 | 4/1972 | Johnson, Jr. et al. . |
| 3,781,562 | 12/1973 | Singh .................................. 250/369 |
| 3,790,785 | 2/1974 | Paolini et al. . |
| 4,158,773 | 6/1979 | Novak ................................ 250/368 |
| 4,160,165 | 7/1979 | McCombs et al. ................. 250/369 |
| 4,351,037 | 9/1982 | Scherbatskoy ........................ 367/85 |
| 4,492,865 | 1/1985 | Murphy et al. ..................... 250/254 |
| 4,596,926 | 6/1986 | Coope ................................ 250/266 |
| 4,698,501 | 5/1985 | Paske ................................. 250/254 |
| 4,814,609 | 3/1989 | Wraight et al. ..................... 250/254 |

OTHER PUBLICATIONS

Allen, L. S., et al., "Dual-Spaced Neutron Logging for Porosity", Geophysics, vol. XXXII, No. 1, (Feb. 1967), pp. 60-68.

Kazakevich, G. M., et al., "Flat Slow-Neutron Scintillation Detector with a Bent Lightguide", Institute of Geology and Geophysics, Siberian Branch, Academy of Sciences of the SSSR, Novosibirsk, 7/1972.

Primary Examiner—Carolyn E. Fields
Attorney, Agent, or Firm—Christie, Parker & Hale

[57] ABSTRACT

Improved radioactivity well logging by mounting a scintillator in a hole extending through a drill collar at the lower end of a drill string so that measurements can be made while drilling. Radioactive sources (when required for well logging) are mounted in cavities which open to the exterior of the drill collar. Light from the scintillator is coupled through a right-angle prism or fiber optics through an angle of about 90° so that an elongated photomultiplier tube can be mounted within a housing within the drill collar with the longitudinal axis of the photomultiplier tube extending substantially parallel to the axis of the drill collar to provide maximum cross sectional area for flow of drilling fluid with the housing in the drill collar.

22 Claims, 6 Drawing Sheets

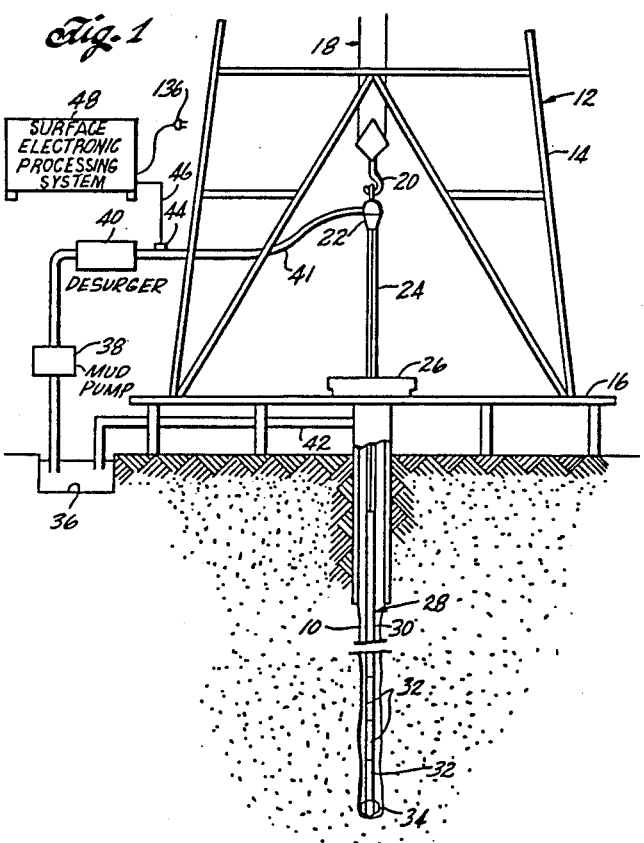

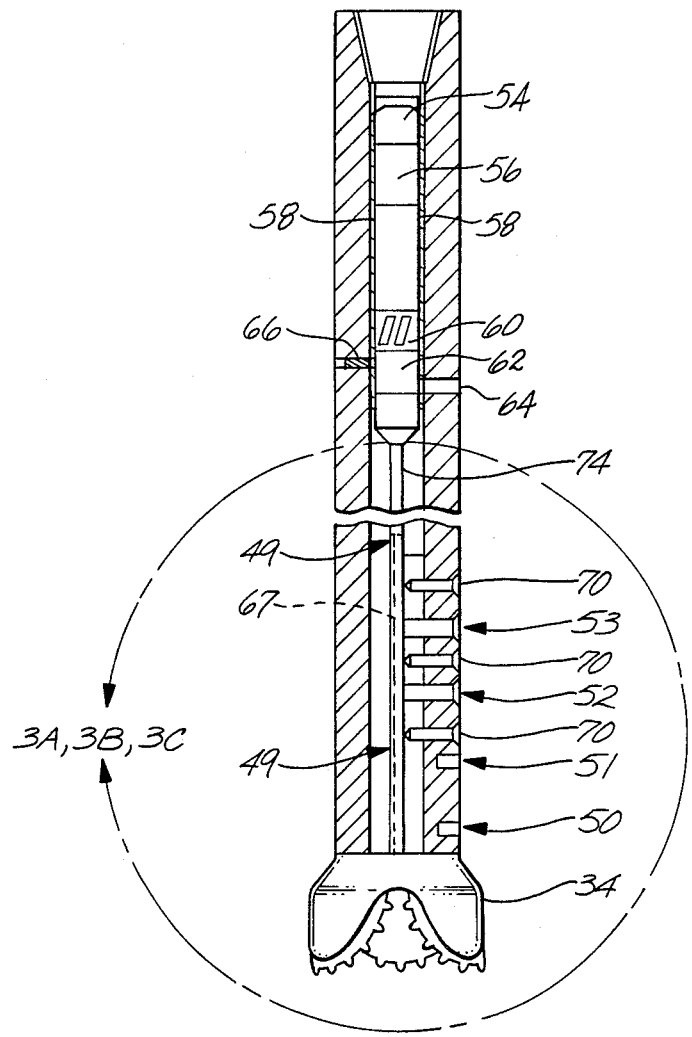

EXTERNALLY MOUNTED RADIOACTIVITY DETECTOR FOR MWD

BACKGROUND OF THE INVENTION

1. Field of the Invention

This invention relates to radioactivity well logging during drilling.

2. The Prior Art

It has long been the practice to measure radioactivity (either natural or induced) in formations penetrated by a well. Originally, to conduct such logging operations, drilling was stopped, the drill string removed from the well, and a radioactivity well logging tool run into the well on an electrically conductive cable to measure the radioactivity of formations of interest.

Many prior art patents disclose well logging of natural gamma ray intensity, or induced radioactivity (using either a gamma ray or a neutron source and detecting gamma rays scattered back to the logging instrument from the formation, or detecting neutrons slowed by the formation and scattered back to the logging instrument). For example, U.S. Pat. No. 2,481,014 to Herzog (1949) discloses natural gamma ray logging with a tool lowered into and raised from a well on an electrically conductive cable. U.S. Pat. No. 2,666,146 to Herzog (1950) discloses the use of a neutron source to bombard formations surrounding a well bore with neutrons to cause gamma rays to be emitted from the formation due to nuclear collision of the neutrons with atoms in the formation. U.S. Pat. No. 2,857,522 to Jones (1958) discloses well logging equipment adapted to be lowered into a well from which the drill string has been removed. The Jones well logging equipment discloses detecting beta rays with a scintillator mounted in the sidewall of a logging tool (sonde) adapted to be lowered into and removed from a well from which the drill string has previously been removed.

To avoid the cost of having to stop drilling, withdraw the drill string, enter the well with special well logging equipment, remove the well logging equipment, and re-enter the well bore with the drill string, systems have been developed for logging without removing the drill string. For example, U.S. Pat. No. 4,351,037 to Scherbatskoy (1982) and U.S. Pat. No. 4,216,536 to More (1980) refer to gamma ray well logging with the drill string in the hole, but they do not disclose how to mount the radioactivity sensors in the drill string.

Using radioactivity detectors mounted within the drill string so that natural gamma ray measurements can be made without having to remove the drill string from the well has the advantage of logging formations without first having to remove the drill string from the well. However, logging with such a system is of limited value because mounting the radioactivity sensor within the drill string significantly reduces sensitivity. For example, in natural gamma ray logging, the measured gamma ray intensity with a sensor inside the drill string (i.e., within the thick-walled drill collars at the lower end of the drill string) is only about 10% of that compared with conventional well logging tools where there is no drill collar to shield the natural radioactivity of the formation. The drill collar wall can attenuate neutron flux by a factor of 5. Moreover, mounting the radioactivity sensors within the drill collar makes it difficult to service and replace them in the field.

SUMMARY OF THE INVENTION

This invention provides apparatus with one or more radioactivity detectors, each mounted in a respective hole extending through the wall of a drill collar to minimize the shielding effect of the drill collar. As used herein, "radioactivity" includes gamma rays (natural and induced) and fast, epithermal, and thermal neutrons. Preferably, the radioactivity is detected with a scintillator. The invention also provides apparatus with radioactive sources (when used) mounted in cavities on the exterior of the drill collar to minimize the shielding effects of the drill collar on the radioactive source, whether it is a source of gamma rays or neutrons. With the apparatus of this invention, the sensors and sources can be removed and installed easily and quickly in the field to facilitate servicing and providing a wide range of well logging.

A further advantage of this invention is that for gamma ray-gamma ray logging to determine formation density, or neutron logging to measure formation porosity, the measurement is made before the formation is severely contaminated by intrusion of drilling mud filtrate or obscured by the buildup of drilling mud filter cake on the wall bore wall.

The outer portion of the scintillator mounted in the hole through the drill collar receives gamma rays or neutrons, which are converted into flashes of light that are transmitted inwardly through the scintillator and light-coupling means to a photomultiplier tube mounted in an electronics housing secured to the inside of the drill collar and disposed to permit drilling liquid to flow past it. Thus, light emitted by the scintillator may be detected with the drill string in the well, and even when drilling fluid is flowing through the drill collar.

Preferably, the electronics housing is sealed at atmospheric pressure, and designed to withstand the high hydrostatic pressure encountered in drilling deep wells, say, up to 20,000 psi. The scintillator is also preferably mounted in a case designed to withstand the same hydrostatic pressure. Moreover, the scintillator, or scintillator case when the scintillator is enclosed in a case, is sealed in the drill collar bore to withstand the drilling fluid differential pressure across the drill collar wall during drilling operations, which can be the order of several thousand psi.

In a preferred form of the invention, the photomultiplier tube is connected to the scintillator crystal through light-coupling means which changes the direction of the light from the scintillator from a substantially radial direction with respect to the longitudinal axis of the drill collar to a direction substantially parallel with the drill collar longitudinal axis. This permits the photomultiplier tube to be mounted with its longitudinal axis substantially parallel to that of the drill collar and thus minimize the cross sectional area of the electronics housing to leave maximum cross sectional area for flow of drilling fluid through the drill collar.

In the preferred form of the invention, the scintillator is enclosed in a sturdy metal case (preferably stainless steel) sealed in the drill collar hole and also in a hole through the electronics housing wall. This causes the electronics housing to be urged against the interior of the drill collar wall with a force equal to the pressure of the drilling fluid in the drill collar multiplied by the cross sectional area of the scintillator case sealed in the hole of the electronics housing wall. With this arrangement, the scintillator case also acts as a load-bearing plug against shear forces between the drill collar and the electronics housing.

The preferred form of the invention also includes a radioactive source mounted in a cavity on the outer surface of the drill collar to provide either gamma rays or neutrons for bombarding the formations to be logged. Preferably, the source and scintillator are on the same side of the drill collar to minimize interference from the drill collar and surrounding drilling fluid and any mud cake on the well bore wall.

In another preferred form of the invention, two scintillators are each mounted in a respective hole extending through the drill collar wall, as described above, and each are connected by respective light-coupling means to a respective photomultiplier tube in the electronics housing. The scintillators are spaced from each other in a direction substantially parallel to the longitudinal axis of the drill collar and may measure either the same or different types of radiation returning from the formation. This permits either compensated logs to be taken of the same type of radiation, or simultaneous logging of different types of radioactivity. For example, one scintillator may measure gamma rays, while the other measures neutrons, either thermal or epithermal.

In the preferred embodiment of the invention, as described in detail below, pressure pulses are transmitted through the drilling liquid used in normal drilling operations to send radioactivity well logging data from the vicinity of the drill bit to the surface of the earth. As the well is drilled, at least one downhole radioactivity intensity within the well is sensed, and a signal is generated to represent the sensed condition. The signal is used to alter the flow of drilling liquid in the well to cause pulses at the surface to produce an appropriate signal representing the sensed downhole condition.

BRIEF DESCRIPTION OF THE DRAWINGS

FIG. 1 shows a system for simultaneously drilling and logging a well;

FIG. 2 is a longitudinal section of the logging portion of the drill collar at the lower end of the drill string;

DESCRIPTION OF SPECIFIC EMBODIMENTS

Figure 3A:
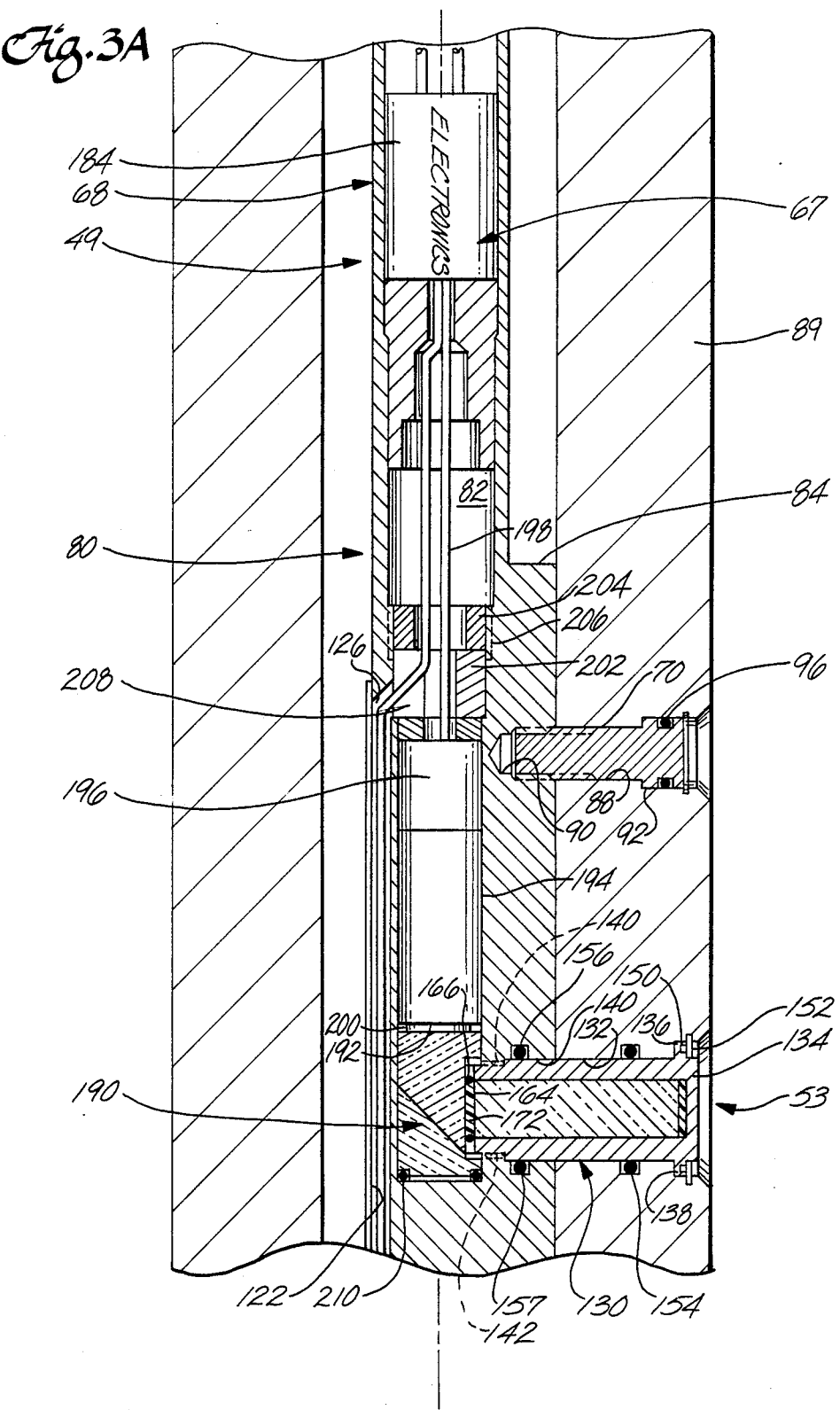
FIGS. 3A, 3B, and 3C are enlarged fragmentary views taken within the area of the arrows 3A, B, and C of FIG. 2.

Referring to FIG. 1, a well 10 is drilled in the earth with a rotary drilling rig 12, which includes the usual derrick 14, derrick floor 16, draw works 18, hook 20, swivel 22, kelly joint 24, rotary table 26, and drill string 28 that includes a length of conventional drill pipe sections 30 secured at its upper end to the lower end of the kelly joint 24 and at its lower end to the upper end of a length of drill collars 32, the lower end of which carries a drill bit 34.

Drilling liquid (or mud, as it is commonly called) circulates from a mud pit 36 through a mud pump 38, a desurger 40, a mud supply line 41, and into the swivel 22. The drilling mud flows down through the kelly joint, the drill string, and out through jets (not shown) in the drill bit. The drilling mud flows back up through the annular space between the outer diameter of the drill string and the well bore to the surface, where it returns to the mud pit through mud return line 42. The usual shaker screen for separating formation cuttings from the drilling mud before it returns to the mud pit is not shown.

A transducer 44 mounted in mud supply line 41 detects variations in drilling mud pressure at the surface. The transducer generates electrical signals responsive to drilling mud pressure variations, and these signals are transmitted by an electrical conductor 46 to a surface electronic processing system 48, which may be of the type described in U.S. Pat. No. 4,216,536 to More, and which is incorporated herein by reference to that patent.

Referring to FIGS. 2 and 3A–3C, a logging tool 49 is located within the drill collar nearest the drill bit. The logging tool includes a lower radioactivity source 50 (FIGS. 2 and 3C), an upper radioactivity source 51 and a lower scintillator 52 (FIGS. 2 and 3B), and an upper scintillator 53 (FIGS. 2 and 3A), all spaced from each other in that order from bottom to top, and all lying in a plane which includes the longitudinal axis of the drill collar.

As shown diagrammatically in FIG. 2, the logging tool 49 also includes a mud turbine 54 for extracting some energy from the flowing drilling mud, ad a generator 56 for converting the rotational energy of the turbine 54 into electrical energy to supply power to the subsurface components (described below) in the logging tool.

Conventional wings or spiders 58 stabilize the turbine and generator inside the drill collar. A mud pulsing unit 60 receives power from the generator, and releases drilling mud from inside the drill collar to the annular space between the drill collar outside diameter and the well bore on command. This is accomplished by changing the state of a pulser valve 62 (FIG. 2) to allow drilling liquid to vent through an orifice 64 extending through the drill collar wall. When the valve opens, a portion of the drilling mud flows out through the orifice, and bypasses the pressure drop imposed on the drilling mud flowing through the drill bit jets (not shown). This causes the mud pressure at the surface to decrease below its normal operating value. When the valve closes, the drilling mud pressure at the surface returns to its normal condition. Thus, opening and closing the valve creates a negative pressure pulse at the surface. The pulsing valve and its associated driving equipment may be of any suitable type which causes a pressure pulse in the drilling mud of sufficient amplitude for detection at the surface. U.S. Pat. No. 4,351,037 to Scherbatskoy (1982) discloses a suitable valve for this purpose. U.S. Pat. No. 4,078,620 to Westlake et al (1978) discloses another system for generating pressure pulses in the drilling mud. If positive pulsing is desired, the pulser unit may be of the type disclosed in U.S. Pat. Nos. 2,925,251 to Arps (1960) or 3,958,217 to Spinnler (1976). The turbine, generator, and pulser valve are stabilized concentrically within the drill collar by the wings or spiders 58 and are secured from moving axially and rotationally by a bolt 66 threaded through the drill collar wall to fit into a threaded opening (not shown) in the portion of the logging tool which houses the pulser valve.

A subsurface electronic system 67 for processing and storing data is mounted in a fluid-tight electronics housing 68 secured against the inside wall of the drill collar by three vertically spaced socket head bolts 70. Mechanical and electrical connections are made from the electronics housing to the pulser valve unit by a hollow transition piece 74 (FIG. 2).

The subsurface electronics system in the electronics housing can be of any suitable type, such as that disclosed in U.S. Pat. No. 4,216,536 to More, which is incorporated herein by reference.

Figure 3B:
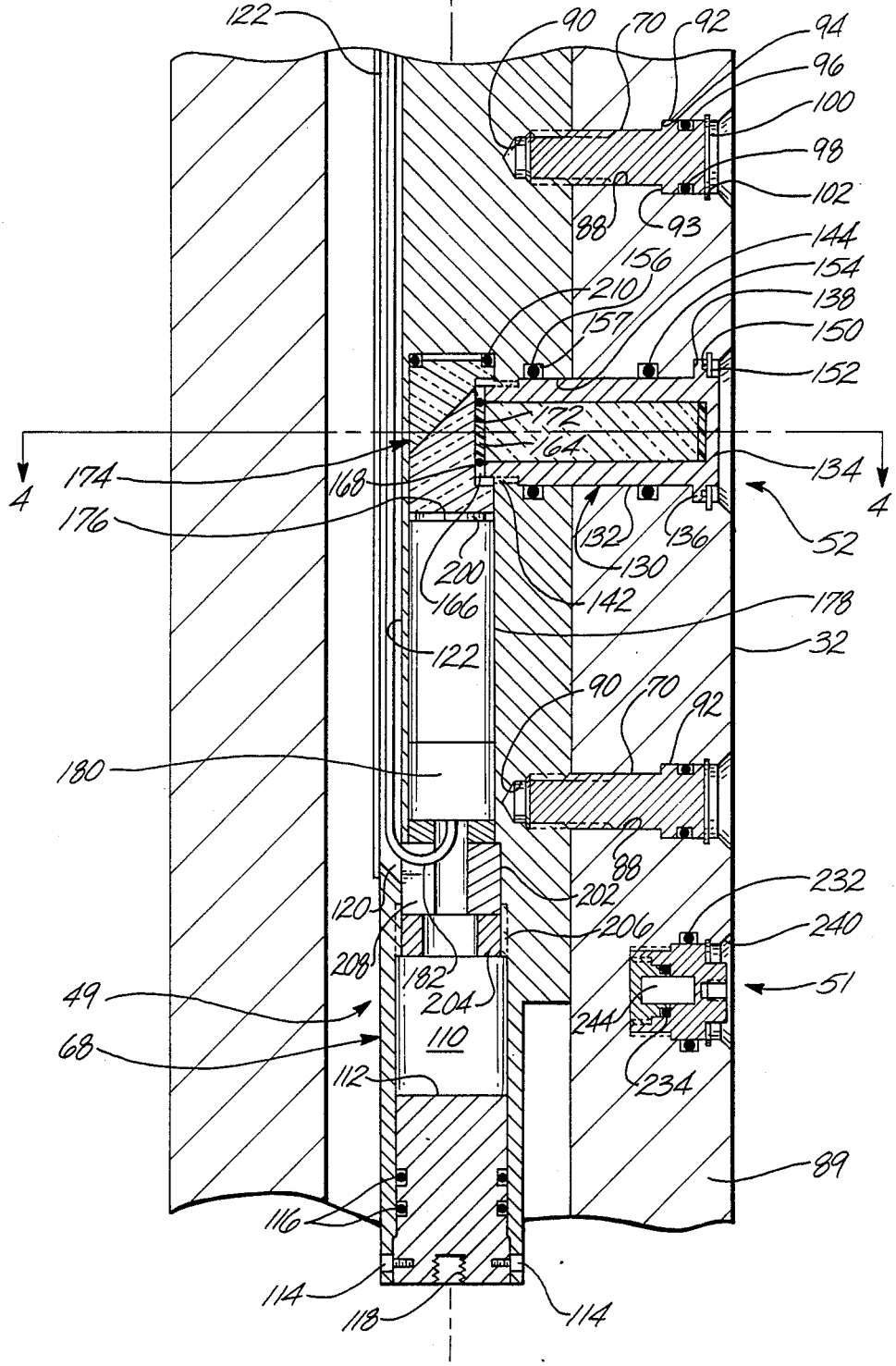

Referring to FIGS. 3A and 3B, the electronics housing 68 includes an elongated body 80 with an upper central longitudinal bore 82 located on the longitudinal axis of the drill collar in which the housing is mounted.

Figure 4:
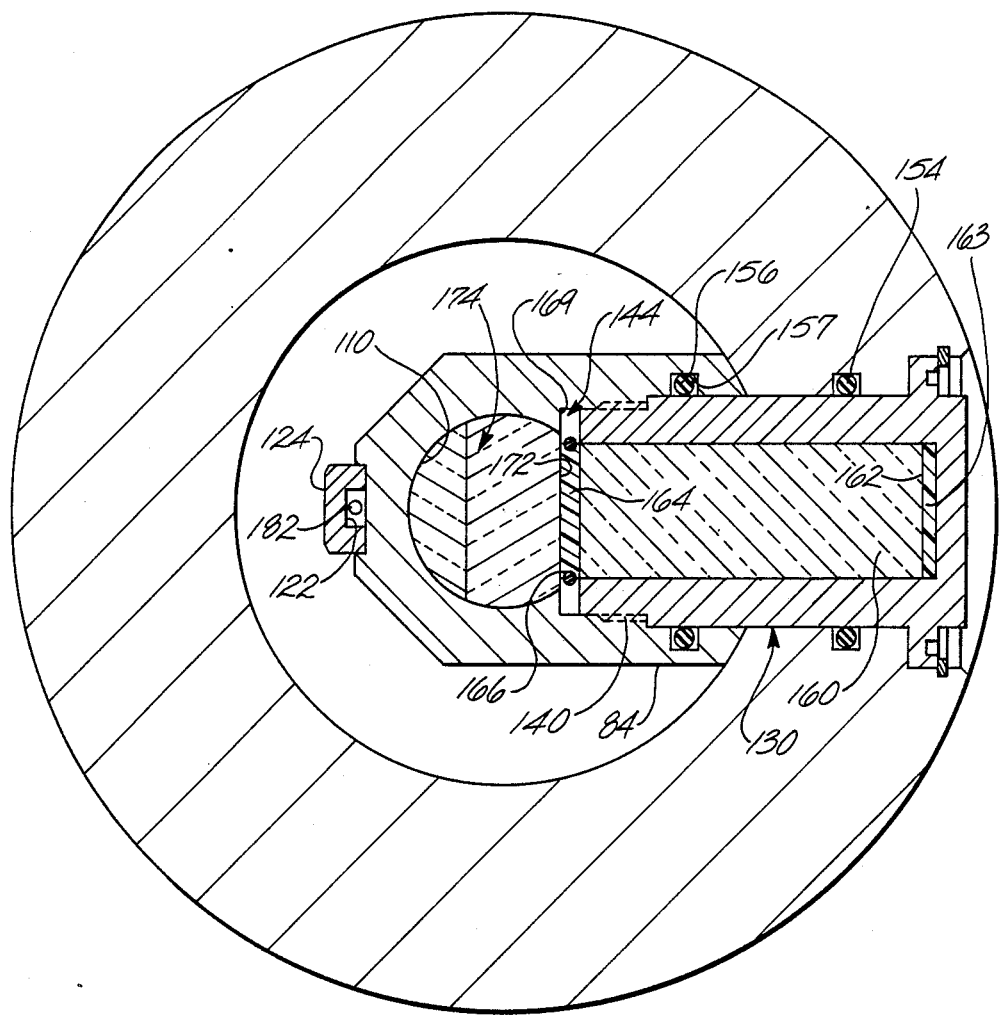
FIG. 4 is a view taken on line 4—4 of FIG. 3B.

A mounting block 84 formed integrally with the central portion of the electronics housing extends outwardly from one side of the housing. As shown in FIG. 4, the outer surface of the mounting block curves convex outwardly to match the curvature of the inside diameter of the drill collar. The three vertically-spaced socket head bolts 70 secure the electronics housing mounting block 84 against the interior surface of the drill collar wall. Each socket head bolt extends through a respective horizontal stepped bolt hole 88 through the drill collar wall 89. Each bolt hole is of decreasing diameter from its outer to its inner end. The inner end of each bolt threads into a respective internally threaded socket 90 in the exterior face of the mounting block. Each bolt includes a head 92 with an inwardly facing shoulder 93 which bears against an outwardly facing shoulder 94 at the outer end of the hole in which the bolt is disposed. A separate O-ring 96 in an outwardly opening channel 98 around each bolt head makes a fluid-tight seal against the respective bolt hole in which the bolt head is disposed. A separate C-shaped retaining ring 100 fits in a respective inwardly opening annular groove 102 at the outer end of each bolt hole, and bears against the outer surface of the bolt in the hole.

The O-rings 96 make a fluid-tight seal against the outer ends of the bolt holes to prevent drilling mud within the drill collar from leaking out to the drill collar exterior when the mud pumps are operated to create a higher pressure within the drill collar than outside. That pressure difference can be as high as several thousand pounds per square inch.

The electronics housing includes a lower vertical bore 110 on the longitudinal axis of the drill collar. The lower end of bore 110 is closed by a plug 112 locked in the lower end of bore 110 by socket head cap screws 114. A pair of O-rings 116 make a fluid-tight seal between the plug and lower end of the lower housing bore. The lower end of the plug 112 includes a downwardly opening and internally threaded recess 118 adapted to receive a threaded tool (not shown), which can be used to pull the plug from the lower bore 110 when servicing is required.

A laterally extending passage 120 (FIG. 3B) connects the upper end of lower bore 110 to a wire channel 122 formed within an elongated and longitudinally extending U-shaped strip 124 bonded (say, by welding) to the exterior of the electronics housing opposite from the side of the housing bolted against the interior of the drill collar wall.

The upper end of the wire channel opens through a lateral passageway 126 (FIG. 3A) into the lower end of the upper bore 82 of the electronics housing.

As shown in FIGS. 3B and 4, the lower scintillator 53 includes a stainless steel cylindrical scintillator case 130 which makes a close sliding fit in a case hole 132 extending radially through the drill collar wall. The outer end of the case includes an integrally-formed cap 134. An annular flange 136 on the cap rests on an outwardly facing shoulder 138 at the outer end of the case hole.

The inner end of the case includes external threads 140 threaded into an internally threaded socket 142 at the inner end of a case hole 144 extending through the electronics housing mounting block and into the upper end of the lower bore 110 of the electronics housing. Outwardly opening spanner wrench holes 150 in the outer surface of the case flange 136 receive a pin or spanner wrench (not shown) so the case can be screwed tightly into, or removed from, the threaded socket 142. A C-shaped retaining ring 152 in the outer end of the case hole through the drill collar keeps the case threaded snugly in the position shown in FIGS. 3B and 4. An O-ring 154 in an inwardly opening annular groove in the drill collar case hole makes a fluid-tight seal around the outer end of the scintillator case. An O-ring 156 in an inwardly opening annular groove 157 in the mounting block case hole makes a fluid-tight seal around the inner end of the scintillator case. The O-rings 154 and 156 prevent drilling mud from leaking through the drill collar hole or into the electronics housing. The O-ring 156 also causes the mounting block to be urged against the drill collar wall with a force equal to the area across the inner diameter of the O-ring times the pressure of the drilling mud in the drill collar.

A cylindrical scintillation crystal 160 (FIGS. 3A and 4) is disposed within the scintillator case. The outer end of the crystal includes a reflecting surface 162, which may be a white reflective material to reflect inwardly flashes of light formed within the crystal. An elastomer shock absorber 163 is between the outer end of the crystal and the inner face of the scintillator case cap.

The inner end of the crystal bears against the outer face of a disk 164 of transparent elastomer material molded within an O-ring 166.

The inner face of the elastomer disk bears against an outwardly facing surface 172 of a lower right-angle prism 174 mounted in the upper end of the lower bore 110 of the electronics housing so that light from the scintillation crystal is reflected 90° into the inlet end 176 of a lower elongated photomultiplier tube 178 (FIG. 3B), the lower end of which is connected to a first decoupling network 180, which decouples the signal from the high voltage applied to the photomultiplier tube. The signal passes through a cable 182 in the wire channel 122 to the electronics system in an electronics box 184 (FIG. 3A) in the upper end of the upper bore 82 of the electronics housing. The longitudinal axis of the photomultiplier tube substantially coincides with that of the drill collar.

A layer of optical silicone grease (not shown), which may be of the conventional type transparent to light, is between the outer face of the elastomer disk and the inner end of the scintillation crystal to improve light coupling and to reduce friction and avoid damage to the disk as the scintillator case 130 is screwed into the threaded socket 142 to the position shown in FIGS. 3B and 4. A layer of optical grease (not shown) is also preferably between the inner face of the elastomer disk and the outwardly facing surface 172 of the prism to improve light coupling between those two elements.

The elastomer disk may be of any suitable material transparent to the light generated in the scintillation crystal. Preferably, it is a clear, hydrophobic silicone elastomer which remains substantially solid at temperatures encountered in the well bore, e.g., up to 200° C. For example, the cured solventless silicone resin potting compound sold by Dow Corning Corp. under the trademark "SYLGARD 184" (a platinum-catalyzed, polydimethylsiloxane, e.g., a vinyl-terminated, linear, dimethyl polysiloxane crosslinked with a silane-terminated, dimethyl polysiloxane), works well because it remains in place, even at high operating temperatures, and provides light coupling and shock mounting.

The upper scintillator 53 is mounted through the drill collar and electronics housing mounting block in a manner identical with that just described for the lower scintillator, and the detailed description of that construction is not repeated. However, like reference numerals are used for like elements in FIG. 3. The light output from the upper scintillator is connected through a similar light-coupling means to an upper right-angle prism 190, which turns the direction of the light 90° to be substantially parallel to the longitudinal axis of the drill collar so that the light enters the inlet end 192 of an upper elongated photomultiplier tube 194 disposed with its longitudinal axis substantially parallel to that of the drill collar longitudinal axis. The photomultiplier tube output is connected to a second decoupling network 196, which in turn is connected by a cable 198 to the electronics system.

Each photomultiplier tube is connected by suitable light-coupling means (such as optical grease, transparent elastomer disk, or the like) to its respective right-angle prism to transmit light with minimum loss. By using the right-angle prisms, the photomultiplier tubes can be mounted with their respective longitudinal axes substantially parallel with that of the drill collar, thus leaving maximum cross sectional area available for flow of drilling mud past the electronics housing. Bundles of fiber optics (not shown) could be used instead of the right-angle prism to change the direction of the light from the scintillators about 90° from a substantially radial to a substantially longitudinal direction.

Each photomultiplier tube is held in place by an annular spacer 202, which in turn is held in place by a lock nut 204 threaded into a respective internally threaded section 206 in the upper and lower bores 82 and 110. Each spacer includes a laterally opening slot 208 to permit the cable from the adjacent photomultiplier tube to pass into the wire channel. The adjacent ends of the right-angle prisms are cushioned against respective O-rings 210 at the inner end of the upper and lower bores 82 and 110, respectively.

Figure 3C:
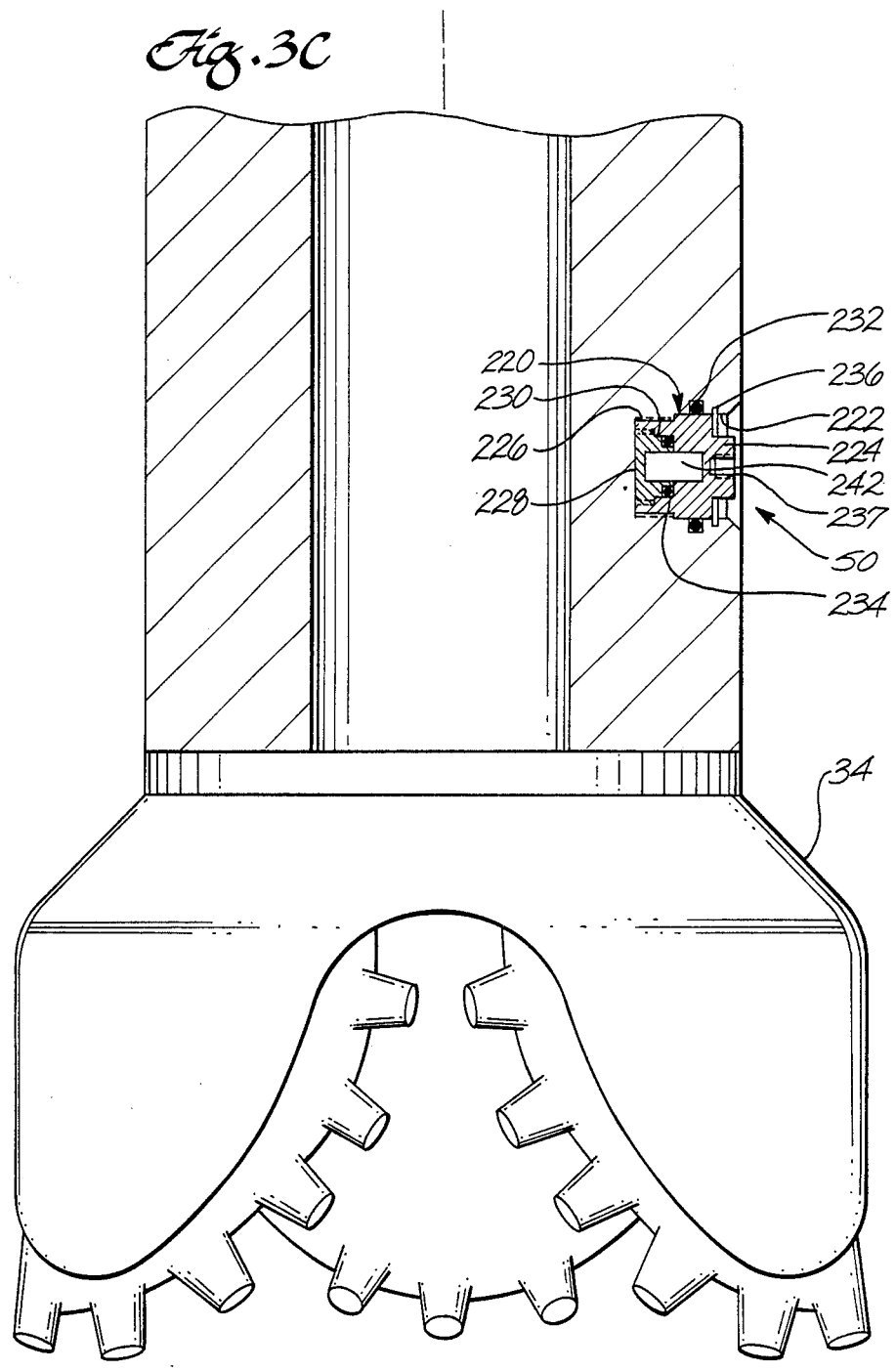

Referring to FIG. 3C, the first radioactive source 50 includes a rugged cylindrical stainless steel capsule 220 disposed in an outwardly opening cylindrical recess 222 in the drill collar wall. The outer end of the capsule is closed by a cap 224 formed integrally with the cylindrical sidewall of the capsule. The inner end of the cylindrical wall of the capsule is threaded externally into an internally threaded socket 226 at the inner end of the recess 222. The inner end of the capsule is closed by a plug 228 threaded around its periphery into an internally threaded socket 230 of the capsule. An O-ring 232 in an inwardly opening annular groove in the recess 222 makes a fluid-tight seal around the exterior of the cylindrical wall of the capsule. An O-ring 234 makes a fluid-tight seal between the cap 228 and the capsule cylindrical body. A retaining ring 236 at the outer end of the recess holds the capsule in place.

An internally threaded, outwardly opening socket 237 in the capsule facilitates insertion and removal of the capsule in the recess 222.

The upper radioactive source 51 is mounted in an outwardly facing recess 240 in the drill collar wall in a manner identical with that for the lower radioactive source.

A first body 242 of radioactive material is sealed within the capsule of the lower source, and a second body 244 of radioactive material is sealed within the capsule of the upper radioactive source.

The radioactive materials in each source can be of any suitable type. For example, in running a gamma ray-gamma ray log to determine the density of the adjacent formation, the presently preferred source of gamma rays is cesium-137. For neutron logging, say, to determine porosity, the preferred source of neutrons is californium-252, because of its relatively high specific activity. Americium-241/beryllium can also be used as a neutron source, but it has a lower specific activity than californium-252. In one embodiment, one source emits gamma rays, and the other emits neutrons.

The capsules for the radioactive sources are preferably made of stainless steel and are designed to withstand pressures in excess of 20,000 psi. The scintillator cases are also designed to withstand pressures greater than 20,000 psi, and may also be made of stainless steel, but preferably are made of titanium because it provides high strength and low density for better gamma ray detection.

The scintillators can be of any suitable type, depending on the type of radiation to be detected. For example, in running a natural gamma ray log (in which case no radioactive source is required), or a gamma ray-gamma ray log (which would require a source of gamma rays) to determine the density of a formation, the presently preferred scintillator includes a cesium iodide crystal activated with sodium or thallium. The cesium iodide is a rugged scintillator noted for high gamma ray stopping power and resistance to thermal and mechanical shock.

For detecting epithermal neutrons (say, for neutron porosity logging), the preferred scintillator includes cerium-activated lithium silicate glass. The elastomer shock absorber at the outer end of the scintillator crystal may also include a layer (not shown) of material, such as cadmium, to capture thermal neutrons arising from the formation, and to convert epithermal neutrons to thermal neutrons for capture in the cerium-activated lithium silicate glass.

As will be appreciated from the foregoing description, this invention provides radioactivity logging apparatus in which a scintillator or scintillators for detecting radioactivity are located in the exterior portion of a drill collar wall for maximum sensitivity and to minimize the effect of drilling mud and drilling mud filter cake. Moreover, each scintillator and radioactive source, when used, can easily be removed for inspection or replacement at the well site and without requiring dismantling of the interior of the logging apparatus. The same is true for the capsules of radioactive material.

We claim:

1. In well drilling apparatus which includes a hollow drill string in the well, a rotatable drill bit on the lower end of the drill string and means for circulating drilling liquid through the drill string, the improvement comprising:

a section of drill collar having an annular wall mounted in the drill string in the vicinity of the drill bit, the drill collar wall having a hole extending through it;

a scintillator mounted in the hole in the drill collar;

an electronics housing disposed within the drill collar and arranged to permit drilling liquid to flow past it;

a photomultiplier tube mounted in the housing; and light-coupling means connecting the scintillator to the photomultiplier tube so light emitted by the scintillator may be detected with the drill string in the well.

2. Apparatus according to claim 1 in which the electronics housing is connected to the interior of the drill collar.

3. Apparatus according to claim 1 or 2 in which the electronics housing is sealed.

4. Apparatus according to claim 1 in which the photomultiplier tube is elongated and is disposed with its longitudinal axis substantially parallel to the drill collar longitudinal axis.

5. Apparatus according to claim 1, 2, or 4 in which the light-coupling means is right-angle prism.

6. Apparatus according to claim 1, 2, or 4 in which the scintillator includes a case sealed in the drill collar hole.

7. Apparatus according to claim 1 or 2 in which a radioactive source is mounted in a recess in the exterior surface of the drill collar wall.

8. Apparatus according to claim 7 in which the radioactive source is selected from a group consisting of materials which emit gamma rays or neutrons.

9. Apparatus according to claim 1 which includes two elongated photomultiplier tubes mounted in the housing, first and second scintillators, each mounted in a respective hole extending through the drill collar, and separate respective light-coupling means connecting each scintillator to a respective photomultiplier tube so that light emitted by each scintillator may be detected with the drill string in the well.

10. Apparatus according to claim 2 which includes two elongated photomultiplier tubes mounted in the housing, first and second scintillators, each mounted in a respective hole extending through the drill collar, and separate respective light-coupling means connecting each scintillator to a respective photomultiplier tube so that light emitted by each scintillator may be detected with the drill string in the well.

11. Apparatus according to claim 9 or 10 in which the longitudinal axis of each photomultiplier tube is substantially parallel with that of the drill collar longitudinal axis.

12. Apparatus according to claim 1, 9, or 10 which includes two separate radioactive sources longitudinally spaced from each other and each sealed in a respective recess in the outer surface of the drill collar wall.

13. Apparatus according to claims 1, 2, 9, or 10 in which the light-coupling means is a transparent elastomer molded within an O-ring.

14. Apparatus according to claim 13, in which the elastomer is a silicone resin.

15. In a well drilling apparatus which includes a hollow drill string in the well, a rotatable drill bit on the lower end of the drill string and means for circulating drilling liquid through the drill string, the improvement comprising:
a section of drill collar having an annular wall mounted in the drill string in the vicinity of the drill bit, the drill collar wall having a hole extending through it;
an electronics housing disposed within the drill collar and arranged to permit drilling liquid to flow past it, the electronics housing having a hole;
a scintillator having a case sealed in the drill collar hole and sealed in the housing hole such that pressure of the drilling mud within the drill collar urges the housing towards the drill collar wall;
a photomultiplier tube mounted in the housing and light coupling means connecting the scintillator to the photomultiplier tube so light emitted by the scintillator may be detected with the drill string in the well.

16. Apparatus according to claim 15 in which the holes through the drill collar wall and housing are substantially colinear so that the case resists relative movement between the electronics housing and drill collar wall in a direction with a component parallel to the longitudinal axis of the drill collar wall.

17. In a well drilling apparatus which includes a hollow drill string in the well, a rotatable drill bit on the lower end of the drill string and means for circulating drilling liquid through the drill string, the improvement comprising:
a section of drill collar having an annular wall mounted in the drill string in the vicinity of the drill bit, the drill collar wall having a hole extending through it;
at least one scintillator mounted in the hole in the drill collar;
an electronics housing disposed within the drill collar and arranged to permit drilling liquid to flow past it;
a photomultiplier tube mounted in the housing; and
light coupling means connecting the at least one scintillator to the photomultiplier tube so light emitted by the at least one scintillator may be detected with the drill string in the well;
two separate radioactive sources longitudinally spaced from each other and each sealed in a respective recess in the outer surface of the drill collar wall, one of the radioactive sources emitting gamma rays and the other radioactive source emitting neutrons.

18. An apparatus according to claim 17 further comprising:
two elongated photomultiplier tubes mounted in the housing;
first and second scintillators each mounted in a respective hole extending through the drill collar, one scintillator detecting gamma rays and the other scintillator detecting epithermal neutrons and separate respective light-coupling means connecting each scintillator to a respective photomultiplier tube so that light emitted by each scintillator may be detected with the drill string in the well.
first and second scintillators each mounted in one of the holes extending through the drill collar, the first scintillator detecting gamma rays, the second scintillator detecting epithermal neutrons and separate respective light-coupling means connecting each scintillator to a respective photomultiplier tube so that light emitted by each scintillator may be detected with the drill string in the well.

19. Apparatus according to claim 17 in which the radioactive sources are on the same side of the drill collar and are substantially in a common plane substantially parallel to the longitudinal axis of the drill collar.

20. Apparatus according to claim 18 in which the scintillators and radioactive sources are mounted on the same side of the drill collar and are substantially in the common plane substantially parallel to the longitudinal axis of the drill collar.

21. In a well drilling apparatus which includes a hollow drill string in the well, a rotatable drill bit on the lower end of the drill string and means for circulating drilling liquid through the drill string, the improvement comprising:
- a section of drill collar having an annular wall mounted in the drill string in the vicinity of the drill bit, the drill collar wall having two holes extending through it;
- an electronics housing disposed within the drill collar and arranged to permit drilling liquid to flow past it;
- two elongated photomultiplier tubes mounted in the housing;

22. Apparatus according to claim 21 in which the scintillators are on the same side of the drill collar and are substantially in a common plane substantially parallel to the longitudinal axis of the drill collar.

* * * * *

UNITED STATES PATENT AND TRADEMARK OFFICE
CERTIFICATE OF CORRECTION

PATENT NO.  : 4,904,865
DATED       : February 27, 1990
INVENTOR(S) : J.E. Meisner; R.L. Tresler; E.S. Mumby; M.D. Robie It is certified that error appears in the above-identified patent and that said Letters Patent is hereby corrected as shown below:

Column 4, line 21, change "ad" to -- and --.

Column 10, lines 52-59, delete the paragraph "first and second scintillators each mounted in one of the holes . . . in the well."

Column 12, lines 5,6, insert the following paragraph:
-- first and second scintillators each mounted in one of the holes extending through the drill collar, the first scintillator detecting gamma rays, the second scintillator detecting epithermal neutrons and separate respective light-coupling means connecting each scintillator to a respective photomultiplier tube so that light emitted by each scintillator may be detected with the drill string in the well. --

Signed and Sealed this

Thirty-first Day of December, 1991

*Attest:*

HARRY F. MANBECK, JR.

*Attesting Officer*   *Commissioner of Patents and Trademarks*